United States Patent [19]

Brasen

[11] 4,255,308

[45] Mar. 10, 1981

[54] WATER BASED ACRYLIC LACQUER COMPOSITION

[75] Inventor: Wallace R. Brasen, Chadds Ford, Pa.

[73] Assignee: E. I. Du Pont de Nemours and Company, Wilmington, Del.

[21] Appl. No.: 57,114

[22] Filed: Jul. 12, 1979

Related U.S. Application Data

[63] Continuation-in-part of Ser. No. 867,118, Jan. 5, 1978, abandoned.

[51] Int. Cl.³ .............................................. C08L 33/10
[52] U.S. Cl. .................. 260/29.6 RW; 260/29.6 TA; 260/29.6 WB; 428/334; 428/463; 525/77; 525/78; 525/243
[58] Field of Search ............... 428/327, 334, 335, 336, 428/463, 522; 260/29.6 RW, 31.8 M, 31.6, 33.6 UA, 45.75 P, 29.6 TA, 29.6 AT, 29.6 CN, 29.6 WB; 525/77, 78, 243, 260

[56] References Cited

U.S. PATENT DOCUMENTS

| | | | |
|---|---|---|---|
| 2,940,872 | 6/1960 | Gusman et al. | 117/75 |
| 3,074,895 | 1/1963 | Jackson | 260/22 R |
| 3,074,895 | 1/1963 | Jackson | 260/22 |
| 3,189,663 | 6/1965 | Nozaki | 260/879 |
| 3,222,423 | 12/1965 | Roebuck | 260/877 |
| 3,370,009 | 2/1968 | Morduchowitz | 252/56 |
| 3,382,294 | 5/1968 | Cristenson et al. | 260/850 |
| 3,450,796 | 6/1969 | Griffin | 260/885 |
| 3,454,516 | 7/1969 | Victorius | 260/29.6 |
| 3,509,055 | 4/1970 | Bauer | 252/56 |
| 3,514,500 | 5/1970 | Osmond et al. | 260/874 |
| 3,705,124 | 12/1972 | Selby et al. | 260/29.6 TA |
| 3,718,500 | 2/1973 | Nyquist | 117/132 R |
| 3,773,710 | 11/1973 | Victorius | 260/41 B |
| 3,823,205 | 7/1974 | Zimmt | 260/901 |
| 3,919,154 | 11/1975 | Chang et al. | 260/2.94 UA |
| 3,928,273 | 12/1975 | Chang et al. | 260/29.4 UA |
| 3,953,644 | 4/1976 | Camelon et al. | 428/220 |
| 3,980,602 | 9/1976 | Jakubauskas | 260/29.6 TA |
| 3,991,235 | 11/1976 | Miller et al. | 427/195 |
| 4,012,559 | 3/1977 | Fujioka et al. | 428/463 |
| 4,048,130 | 9/1977 | Brunold et al. | 260/29.6 NB |
| 4,064,087 | 12/1977 | Das | 260/29.6 RB |
| 4,071,653 | 1/1978 | Boessler et al. | 428/332 |

FOREIGN PATENT DOCUMENTS

| | | |
|---|---|---|
| 48-49823 | 7/1973 | Japan . |
| 50-40630 | 4/1975 | Japan . |
| 50-115294 | 9/1975 | Japan . |
| 51-116833 | 10/1976 | Japan . |
| 1340025 | 12/1973 | United Kingdom . |
| 1374839 | 11/1974 | United Kingdom . |

*Primary Examiner*—Lorenzo B. Hayes
*Assistant Examiner*—Amelia B. Yarbrough

[57] ABSTRACT

An aqueous dispersion lacquer composition of a binder in an aqueous medium; the binder is comprised of (1) a dispersed Polymer A of methyl methacrylate that can contain small amounts of adhesion promoting monomers such as diethyl amino ethyl methacrylate and other monomers that lower the glass transition temperature of the polymer such as butyl methacrylate or butyl acrylate;

(2) a dispersant Polymer B of methyl methacrylate, optionally, styrene, an alkyl acrylate or an alkyl methacrylate and an ethylenically unsaturated carboxylic acid; and (3) a graft copolymer of the dispersed Polymer A and the dispersant Polymer B; and The composition contains sufficient base such as amine or ammonium hydroxide to provide a pH of about 7-9 and usually contains conventional plasticizers, pigments and other additives as are used in aqueous coating compositions.

The composition is used an an exterior finish for automobile and truck bodies.

34 Claims, No Drawings

WATER BASED ACRYLIC LACQUER COMPOSITION

CROSS-REFERENCE TO RELATED APPLICATIONS

This application is a continuation-in-part application Ser. No. 867,118 filed Jan. 5, 1978, now abandoned.

BACKGROUND OF THE INVENTION

This invention is related to a coating composition and in particular to an aqueous acrylic lacquer coating composition.

Solvent based acrylic lacquer coating compositions have been widely used to finish automobile and truck bodies. Typical compositions that have been used are shown in Evans U.S. Pat. No. 2,849,409 issued Aug. 26, 1958, Crissey and Lowell patents U.S. Pat. Nos. 2,934,509 and 2,934,510 both issued Apr. 26, 1960 and Zimmt U.S. Pat. No. 3,823,205 issued July 9, 1974. While these compositions form high quality finishes on automobiles and trucks, they do not comply with air pollution regulations of some states and are not expected to comply with air pollution regulations that are being promulgated by many of the other states.

There is a need for a water based lacquer coating composition that will meet the following requirements: complys with current and future air pollution regulations, has good storage stability, forms finishes on automobiles and trucks that have a good appearance, particularly good glamour, that are free from popping and sagging, that are durable and weatherable and that can be spot repaired by using conventional techniques used for current solvent based acrylic lacquer finishes. The novel composition of this invention meets the aforesaid requirements.

SUMMARY OF THE INVENTION

The aqueous dispersion lacquer composition contains about 5–60% by weight of a binder and about 40–95% by weight of an aqueous medium; wherein the binder contains a dispersed Polymer A of methyl methacrylate and optionally, an adhesion promoting constituent and optionally, other monomers that lower the glass transition temperature of the polymer and the polymer has a weight average molecular weight of about 60,000 to 110,000 measured by gel permeation chromatography using polystyrene as a standard; and a dispersant Polymer B of methyl methacrylate, optionally, styrene, an alkyl methacrylate or an alkyl acrylate, each having 2–12 carbon atoms in the alkyl group, and an ethylenically unsaturated carboxylic acid and the polymer has a weight average molecular weight of about 20,000 to 70,000, measured as above; and a graft copolymer of the dispersed Polymer A and the dispersant Polymer B and has a weight average molecular weight of about 50,000–80,000 measured as above; and the composition contains sufficient base such as amine or ammonium hydroxide to provide a pH of about 7–9.

DESCRIPTION OF THE PREFERRED EMBODIMENTS

The aqueous dispersion lacquer composition contains a dispersed Polymer A which is a methyl methacrylate polymer or a methyl methacrylate copolymer containing adhesion promoting constituents such as diethyl amino ethyl methacrylate and optionally other monomers. The dispersed Polymer A is kept dispersed in the composition by dispersant Polymer B which is a polymer of methyl methacrylate, optionally, styrene, an alkyl acrylate or an alkyl methacrylate, each having about 2–12 carbon atoms in the alkyl groups, and an ethylenically unsaturated carboxylic acid such as acrylic acid or methacrylic acid. Sufficient base is present in the composition to form a salt of Polymer B to readily disperse Polymer B in the aqueous medium of the composition. The dispersion also contains a graft copolymer of the dispersed Polymer A and the dispersant Polymer B and makes Polymers A and B more compatible.

One unique aspect of this composition is that upon application to a substrate, the aqueous medium evaporates leaving Polymers A and B and the graft copolymer of A and B. Polymer B is not soluble in Polymer A and forms discrete particles in Polymer A which becomes a continuous phase. The graft copolymer, since it contains both Polymers A and B, stabilizes the composition and facilitates formation of particles of Polymer B. A finish results in which Polymer A is a continuous phase in which particles of Polymer B are dispersed and theoretically the graft copolymer is at the interface of Polymers A and B. Polymer A which does not contain groups such as carboxylic groups or hydroxyl groups that are affected by moisture or solvents forms a protective film that remains glossy and durable even when exposed to extended periods of moisture and weathering. Polymer B which contains carboxyl groups which are necessary to form a stable aqueous dispersion and optionally, hydroxyl groups, and the graft copolymer which is associated with Polymer B are in the form of discrete particles in the continuous film of Polymer A and hence protected from moisture and weathering.

In preparation of the coating composition, Polymers A and B are prepared by solution polymerization in the same reaction vessel. Monomers for Polymer A, solvents and a polymerization initiator are added to a reaction vessel and heated to about 60°–150° C. for about 30 minutes to 4 hours to form Polymer A. Usually temperatures of about 85°–125° C. are used for about 2–4 hours.

Then monomers for Polymer B, solvents and a polymerization initiator are added to the vessel containing the above prepared Polymer A and heated for about the same time and to about the same temperatures as indicated above to form Polymer B. During polymerization that forms Polymer B, the graft copolymer of Polymer A and B is formed. A sufficient amount of a base is added so that the polymers can readily be dispersed in aqueous medium and then water is added to form the aqueous acrylic lacquer coating composition.

Polymer A has a weight average molecular weight of about 60,000 to 110,000 and a number average molecular weight of about 25,000 to 50,000 determined by gel permeation chromatography using polystyrene as a standard.

Polymer B has a weight average molecular weight of about 20,000 to 70,000 and a number average molecular weight of about 12,000 to 25,000 determined by gel permeation chromatography using polystyrene as a standard. The polymer has an acid number of about 20 to 120.

The graft copolymer of Polymers A and B has a weight average molecular weight of about 50,000-80,000 and a number average molecular weight of about 20,000-40,000 determined as above. The graft copolymer has an acid number of about 10-60.

About 0.1-4% by weight, based on the weight of the monomers used to prepare either polymer A or B, of a polymerization initiator is utilized. Typical initiators are azo-bisisobutyronitrile, azo-bis($\alpha\gamma$-dimethylvaleronitrile), benzoyl peroxide and tertiary butyl peroxypivalate. Chain transfer agents can be used to control the molecular weight such as 2-mercaptoethanol, lauryl mercaptan, and the like.

Typical solvents that can be used in the polymerization process are methanol, isopropanol, n-propanol, butanol, diacetone alcohol and other alcohols, acetone, acetyl acetone, ethylene glycol monoethylether, ethylene glycol monobutylether, diethylene glycol monobutylether, and the like. Solvents of limited water solubility can also be used such as methyl ethyl ketone, toluene, xylene and the like.

Polymer A is of methyl methacrylate but can contain up to 5% of polymerized ethylenically unsaturated adhesion promoting monomers. Preferably about 0.5-1.5% by weight of the adhesion promoting monomer is used. Typical adhesion promoting monomers are alkyl amino alkyl acrylates or methacrylates of the formula:

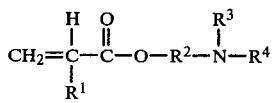

in which
$R^1$ is either hydrogen or methyl
$R^2$ is an aliphatic hydrocarbon group having 1-6 carbon atoms, and
$R^3$ and $R^4$ are either hydrogen, or an aliphatic saturated hydrocarbon group having 1-6 carbon atoms Typical alkyl amino acrylates or methacrylates that are used to form the polymer used in this invention are: dimethylaminoethyl methacrylate, diethylaminoethyl methacrylate, dipropylaminoethyl methacrylate, methylethylaminoethyl methacrylate, butylaminoethyl methacrylate, tertiarybutylaminoethyl methacrylate, diethylaminopropyl methacrylate, diethylaminobutyl methacrylate, diethylaminopentyl methacrylate, diethylaminohexyl methacrylate and the like. Preferred are dimethylaminoethyl methacrylate, diethylaminoethyl methacrylate and tertiarybutylamino ethyl methacrylate, since these compounds form a high quality product and are readily available.

One particularly preferred polymer contains about 99% by weight methyl methacrylate and 1% by weight of diethylaminoethyl methacrylate.

Up to about 15% by weight of other polymerizable ethylenically unsaturated monomers can be used to prepare Polymer A to change the glass transition temperature. Typical monomers that can be used are alkyl acrylates and alkyl methacrylates having 2-18 carbon atoms in the alkyl groups. Butyl methacrylate is one preferred monomer. Acrylonitrile can also be used.

Polymer B is of methyl methacrylate, an alkyl methacrylate or an alkyl acrylate wherein the alkyl groups have 2-12 carbon atoms and an ethylenically unsaturated carboxylic acid. Optionally, up to 25% by weight of styrene can be used in Polymer B. One typical polymer contains about 15-60% by weight of methyl methacrylate, 37-73% by weight of an alkyl acrylate or methacrylate and 3-12% by weight of an ethylenically unsaturated acid. Another typical polymer contains about 5-20% by weight styrene, 10-40% by weight methyl methacrylate, 37-73% by weight of an alkyl acrylate or methacrylate and 3-12% by weight of ethylenically unsaturated acid.

Typical alkyl acrylates and methacrylates that can be used are as follows: ethyl acrylate, propyl acrylate, butyl acrylate, hexyl acrylate, octyl acrylate, nonyl acrylate, lauryl acrylate, ethyl methacrylate, propyl methacrylate, butyl methacrylate, isobutyl methacrylate, hexyl methacrylate, octyl methacrylate, nonyl methacrylate, lauryl methacrylate and the like.

Typical acids are acrylic acid, methacrylic acid, itaconic acid, maleic acid and the like.

One useful polymer contiains methyl methacrylate, butyl acrylate and acrylic acid in weight ratio of 38/55/7. Another useful polymer contains styrene, methyl methacrylate, butyl acrylate and maleic acid in a weight ration of 20/23/47/10. Polymer B can contain up to 10% by weight an usually about 2-8% by weight of a hydroxy alkyl acrylate or methacrylate having 2-4 carbon atoms in the alkyl group. Typical hydroxy alkyl acrylate and methacrylates are hydroxy ethyl acrylate, hydroxy propyl acrylate, hydroxy butyl acrylate, hydroxy ethyl methacrylate, hydroxy propyl methacrylate, hydroxy butyl methacrylate and the like.

A typical Polymer B of the above type contains about 30-60% by weight of methyl methacrylate, 35-52% by weight of an alkyl acrylate or methacrylate having 2-12 carbon atoms in the alkyl group, 2-8% by weight of a hydroxy alkyl acrylate or methacrylate having 2-4 carbon atoms in the alkyl group and 3-10% by weight of acrylic acid or methacrylic acid. One useful polymer comprises methyl methacrylate, butyl acrylate, hydroxy ethyl acrylate and acrylic acid in a weight ratio of about 40/47/6.5/6.5.

The amounts of Polymers A and B and the graft copolymer present in the composition are about 35-94% by weight of Polymer A, 5-40% by weight of Polymer B and 1-40% by weight of the graft copolymer. Generally, the composition contains about 40-65% by weight of Polymer A, 5-25% by weight of Polymer B, and 10-35% by weight of the graft copolymer.

After the polymers are prepared a sufficient amount of a base such as ammonium hydroxide, quaternary ammonium hydroxide or amine is added to Polymers A and B and graft copolymers so that the polymers can be dispersed in water. Additional base can be added to adjust the pH of the resulting composition to about a pH of 7-9. Typical bases that can be used are primary amines, secondary amines, tertiary amines, polyamines, hydroxyamines, or quaternary ammonium hydroxide, such as ethanolamine, diethanolamine, triethanolamine, N-methylethanol amine, N,N-diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetramine, hexamethylene tetramine, triethylamine, tetramethyl ammonium hydroxide and the like. Under some circumstances sodium hydroxide or potassium hydroxide or other inorganic bases can be used.

The coating composition can contain a plasticizer. If a plasticizer is used about 5-40% by weight of the binder is plasticizer and about 60-95% by weight of the binder is Polymers A and B and graft copolymer. The following are typically useful plasticizer: butyl benzyl phthalate, tributyl citrate, certain polyester resins, certain alkyd resins, polystyrene, poly alpha methyl styrene, poly alkyl acrylates of a low molecular weight, polyalkylene ethers, styrene/alkyl acrylate polymers of a low molecular weight and styrene/alkyl methacrylate polymers of a low molecular weight.

Typical polyester resins that are useful plasticizers are an esterification product of a polyol, a dicarboxylic acid or an anhydride of a dicarboxylic acid, a nondrying oil and optionally an aromatic monocarboxylic acid. One useful polyester plasticizer is the esterification product of phthalic anhydride, coconut oil, adipic acid, ethylene glycol and benzoic acid.

The coating composition is capable of complying with current solvent emission standards of 0.34 kilograms of solvent per liter of paint. In general the organic solvent content of the coating composition is kept as low as possible but up to 70% of the volatile material of the composition may be organic solvents. Such a composition may be used to repair finishes at the end of a production line or at a repair facility.

It is preferred to use about 2-6% by weight of high boiling organic solvents in the composition in which Polymer A is soluble. After application on a substrate of a composition containing the preferred solvents discrete particles of Polymer B are readily formed as the composition is drying while Polymer A remains in solution. The graft copolymer in general remains at the interface of Polymers A and B. When the resulting finish is completely dry after being baked at elevated temperatures, Polymer A forms a continuous phase and Polymer B forms discrete particles in the continuous phase and the graft copolymer is at the interface. Typically useful high boiling solvents are diethylene glycol monobutyl ether and N-methyl pyrrolidone.

Generally, the coating composition is pigmented. Pigments are generally used in a pigment to binder weight ratio of about 1/100 to about 150/100.

The pigments are introduced into the coating composition by first forming a mill base with a compatible dispersing resin by conventional techniques such as sand grinding, attritor grinding or ball milling. Then the mill base is blended with the film-forming binder as shown in the Examples. A blend of Polymers A and B and graft copolymers or Polymer B alone described above can be used as dispersing resins. Polyester resins or other acrylic resins can also be used as dispersing resins. One useful acrylic resin is of methyl methacrylate/butyl acrylate/acrylic acid in a weight ratio 50/30/20 or 56/34/10. These acrylic resins are described in U.S. Pat. No. 3,980,602 issued Sept. 14, 1976 to H. L. Jakubauskas.

The following are examples of the great variety of pigments which are used in the coating composition: metallic oxides, preferably titanium dioxide, zinc oxide, and the like, metal hydroxides, metal flakes, such as aluminum flake, bronze flake, "Afflair" pigments, i.e., mica-coated with titanium dioxide, metal powders, chromates, such as lead chromates, sulfides, sulfates, carbonates, carbon black, silica, talc, china clay, phthalocyanine pigments such as copper phthalocyanine blue, iron blues, organic reds, organic maroons, and other organic pigments.

While the inventor does not wish to be held to this theory, it is speculated that the pigment and the dispersing resin become associated with Polymer B and the graft copolymer in the resulting finish after the composition has been applied and baked. This phenomenon provides a finish with an excellent depth of color.

About 0.1 to 1% by weight, based on the weight of the binder, in addition to the other binder constituents of ultraviolet light absorbers can be added to the coating composition. Typical ultraviolet light absorbers are substituted benzophenone derivatives, such as 2,4-dihydroxy benzophenone, a polymeric reaction product of orthohydroxybenzophenone/formaldehyde/phenol, dibenzoate of diphenylol propane, nonyl phenyl benzoate, 2,4-dihydroxyacetophenone, substituted benzotriazoles, such as 2-(2'-hydroxy-5'-methylphenyl)benzotriazole, and the like.

About 0.1-5% by weight, based on the weight of the binder, of iron pyrophosphate can be added to the coating composition to improve certain properties of the composition such as improved resistance to deterioration of finishes caused by high humidity. One typically useful iron pyrophosphate is prepared according to the teachings of Jackson U.S. Pat. No. 3,074,895 issued Jan. 22, 1963.

About 0.01-1% by weight, based on the weight of the binder, of silicone anticratering agents can be used such as polyalkene oxide siloxanes and silicone glycol copolymers.

Up to about 5% by weight based on the weight of the binder, and usually 0.5-4% by weight of a crosslinking agent is added to the composition to react with the carboxyl groups of Polymer B, and the graft copolymer, and if present, the hydroxyl groups of Polymer B and the graft copolymer to render these groups inactive. Capping agents can also be used to inactivate these groups. These groups in Polymer B and the graft copolymer, if not inactivated by a crosslinking agent or a capping agent during baking of the finish after application to a substrate, are affected by moisture and can cause a color change with certain pigments.

Typical crosslinking agents that can be used are epoxy resins, melamine formaldehyde resins, alkylated melamine formaldehyde resins, benzoguanamine formaldehyde resins, phenol formaldehyde resins. Typical capping agents hydroxy alkyl amides such as beta hydroxy alkyl amides. Typical amide agents are bis(N,N-dihydroxyethyl)adipamide, dihydroxyethyl valeramide and dihydroxyethyl hexanamide.

The amount of crosslinking agent is at a low level sufficient only to react with the carboxyl groups and, if present, the hydroxyl groups of Polymer B and the graft copolymer so that a finish of the composition can be spot repaired using conventional techniques that are used to spot repair acrylic lacquer finishes.

A finish resulting from the coating composition of this invention is not crosslinked. A test to determine whether or not a finish is crosslinked is as follows: a film of a coating composition, 2 mils thick, is prepared by applying the coating composition to a glass substrate and baking it for about 2 hours at 160° C. and then removing the film; the film is immersed in methylene chloride at about 20° C. for 2 hours; if the film substantially disintegrates it is not crosslinked. If it does not disintegrate and is still self supporting when removed; it is crosslinked. According to the above test, finishes prepared from coating compositions of this invention are not crosslinked when small amounts of crosslinking agents are added as shown above to inactive carboxyl and hydroxyl groups.

The coating compositions of this invention can be applied to a substrate by any of the usual application methods, such as spraying, electrostatic spraying, dipping, brushing flow coating and the like. These coatings are baked at about 150° to 225° C. for 15 to 45 minutes. The resulting finish is about 0.1-5 mils thick, preferably 1-3 mils thick, and has good gloss. The coating composition of the invention does not yellow on baking and gives a hard, durable, scratch-resistant, gasoline-resistant, weather-resistant, alkali-resistant, glossy coating which is suitable finish for automobile and truck bodies.

A pigmented coating of the coating composition can be applied to a substrate and then a clear coating can be applied directly over the pigmented coating before it has dried to form a finish that has an excellent appearance. To improve outdoor durability and weatherability, both the clear coating and the pigmented coating can contain ultraviolet light absorber.

The following examples illustrate the invention. All parts and percentages are on a weight basis unless indicated otherwise. Molecular weight determinations are made by gel permeation chromatography using polystyrene as the standard. Samples for molecular weight determination of the polymer are either the polymer as prepared or fractions of the total polymer prepared according to conventional solvent fractionation techniques.

EXAMPLE 1

The following constituents are charged into a five liter reaction vessel equipped with a stirrer, reflux condenser, thermometer and a heating mantle:

|  | Parts by Weight |
|---|---|
| Portion 1 | |
| Methyl methacrylate monomer | 891.3 |
| Diethylamino ethyl methacrylate monomer | 8.9 |
| Methyl ethyl ketone | 231.81 |
| Xylene | 147.4 |
| Portion 2 | |
| Azobisisobutyronitrile | 3.8 |
| Methyl ethyl ketone | 40.2 |
| Portion 3 | |
| Methyl methacrylate monomer | 206.3 |
| Diethylamino ethyl methacrylate monomer | 1.9 |
| Methyl ethyl ketone | 94.8 |
| Diethylene glycol monobutyl ether | 118.0 |
| Azobisisobutyronitrile | 3.8 |
| Portion 4 | |
| Methyl methacrylate monomer | 171.7 |
| Butyl acrylate monomer | 250.0 |
| Acrylic Acid monomer | 31.0 |
| Diethylene glycol monobutyl ether | 88.2 |
| Azobisisobutyronitrile | 9.1 |
| Portion 5 | |
| Dimethyl ethanol amine | 38.3 |
| Portion 6 | |
| Water | 1700.0 |
| Total | 4036.51 |

Portion 1 is charged into the reaction vessel and heated to its reflux temperature with constant agitation and then portion 2 is added and the resulting mixture is held at its reflux temperature for 15 minutes. Portion 3 is added over a 70 minute period while maintaining the mixture at its reflux temperature and the mixture is held at this temperature for an additional 10 minutes. Portion 4 is slowly and continuously added over a 60 minute period while maintaining the mixture at its reflux temperature and then the mixture is held at its reflux temperature an additional 20 minutes. Heating of the mixture is stopped and portion 5 is added over a 15 minute period and the mixture is held for 45 minutes to allow neutralization of the acid to occur and then portion 6 is added over a 60 minute period to form an aqueous dispersion lacquer.

The aqueous dispersion lacquer has a film forming polymer solids content of about 39% by weight. The film forming polymer is about 60% by weight of a dispersed polymer of methyl methacrylate/diethylaminoethyl methacrylate in a weight ratio of 99/1 having a weight average molecular weight of about 87,000 and about 10% by weight of a dispersant polymer of methyl methacrylate/butyl acrylate/acrylic acid in a weight ratio of 38/55/7 having a weight average molecular weight of about 47,000 and about 30% by weight of a graft copolymer of the above polymers and have a weight average molecular weight of about 50,000–60,000.

WHITE LACQUER PREPARATION

A white mill base is prepared as follows:

|  | grams |
|---|---|
| Titanium dioxide pigment | 53.84 |
| Acrylic Resin Solution (70% solids of a polymer of methyl methacrylate/ butylacrylate/ acrylic acid in a weight ratio of 56/34/10 in isopropanol solvent) | |
| Dimethylamino ethane | 1.12 |
| Water | 31.84 |
| Total | 100.00 |

The above constituents are charged into a standard sand mill and ground for 45 minutes to form a mill base. A white lacquer paint No. 1 is prepared as follows:

|  | grams |
|---|---|
| Aqueous Dispersion Lacquer (prepared above) | 187.77 |
| Alkyd resin solution (85% alkyd resin in toluene of a resin of cocoanut oil/ethylene glycol/phthalic anhydride having an Acid No. Number of about 5–10, a hydroxyl number 15–20 and a Gardner Holdt viscosity of about y-z₁ measured at 85% solids at 25° C.) | 23.53 |
| White Mill base (prepared above) | 92.94 |
| Diethylene glycol monobutyl ether | 20.00 |
| Dimethyl ethanol amine | 0.37 |
| Water | 33.05 |
| Total | 357.66 |

The above constituents are thoroughly mixed together to form a white lacquer paint that is sprayed onto phosphatized steel panels primed with a conventional alkyd resin primer and sealed with an epoxy resin sealer. The resulting coating is allowed to dry at room temperature for about 10 minutes and then baked at 75° C. for about 10 minutes followed by baking at about 165° C. for about 30 minutes to form a tough, hard, durable and glossy finish.

The finish has a gloss measured at 60° of 89.2 and a gloss measured at 20° of 78.3 and a hardness of 13.0 knoops and is gasoline resistant.

A white lacquer paint No. 2 is prepared as follows:

|  | grams |
|---|---|
| Aqueous Dispersion Lacquer (prepared above) | 187.77 |
| Alkyd resin solution (described above) | 23.53 |
| White Mill Base (prepared above) | 92.94 |
| Diethylene glycol monobutylether | 20.00 |
| Bis(N,N-dihydroxyethyl)adipamide | 3.00 |
| Dimethyl ethanol amine | 0.37 |
| Water | 54.51 |
| Total | 382.12 |

The above paint is spray applied to a phosphatized steel panel primed and sealed as above and baked as above. The resulting finish is tough, hard, durable and glossy as the above finish and has excellent humidity resistance.

BLUE LACQUER PREPARATION

A blue mill base is prepared as follows:

|  | grams |
|---|---|
| Phthalocyanine blue pigment | 667.00 |
| Acrylic Resin Solution (described above) | 276.00 |
| Dimethyl ethanol amine | 27.00 |
| Water | 1330.00 |
| Total | 2300.00 |

The above constituents are charged into an attritor and ground for 3 hours to form a mill base.

An aluminum mill base is prepared as follows:

|  | grams |
|---|---|
| Aluminum Flake Paste (65% aluminum flake in mineral spirits) | 469.00 |
| Acrylic resin solution (described above) | 292.00 |
| Dimethyl ethanol amine | 26.10 |
| Diethylene glycol monobutyl ether | 117.03 |
| Total | 904.13 |

The above constituents are mixed together for about 3 hours to form a mill base.

A black mill base is prepared as follows:

|  | grams |
|---|---|
| Carbon black pigment | 60.00 |
| Acrylic Resin Solution (described above) | 66.00 |
| Dimethyl ethanol amine | 5.71 |
| Water | 489.34 |
|  | 621.05 |

The above constituents are charged into an an attritor and ground for 6 hours to form a mill base.

A light blue metallic paint is prepared as follows:

|  | grams |
|---|---|
| Aqueous Dispersion Lacquer (prepared above) | 202.08 |
| Alkyd resin solution (described above) | 23.53 |
| Blue mill base (prepared above) | 1.15 |
| White mill base (prepared above) | 0.20 |
| Black mill base (prepared above) | 0.66 |

-continued

|  | grams |
|---|---|
| Aluminum mill base (prepared above) | 4.96 |
| Diethylene glycol monobutyl ether | 20.00 |
| Dimethyl ethanol amine | 0.37 |
| Water | 60.90 |
| Total | 313.85 |

The paint is spray applied to a phosphatized steel panel primed and sealed as above and baked as above. The resulting finish is tough, hard, durable and glossy. The finish has a gloss measured at 20° of 78.0 and a gloss measured at 60° of 88.0 and good humidity and gasoline resistance.

An attempt is made to prepare an aqueous dispersion lacquer by first forming the aforementioned dispersed polymer of methyl methacrylate/diethylaminoethyl methacrylate. Then in a second polymerization vessel the dispersant polymers of methyl methacrylate/butyl acrylate/acrylic acid is prepared. The above prepared dispersed polymer and dispersant polymer are thoroughly blended together and sufficient dimethyl ethanol amine is added to neutralize the acid and then water is added to provide a composition having a 39% polymer solids content. The resulting mixture does not produce a stable dispersion and the polymers rapidly separate and settle out.

EXAMPLE 2

The following constituents are changed into a five liter polymerization vessel equipped as in Example 1:

|  | Parts by Weight |
|---|---|
| Portion 1 |  |
| Methyl methacrylate monomer | 895.6 |
| Methyl ethyl ketone | 220.0 |
| Xylene | 140.0 |
| Portion 2 |  |
| Azobisisobutyronitrile | 3.8 |
| Methyl ethyl ketone | 38.0 |
| Portion 3 |  |
| Methyl methacrylate monomer | 197.5 |
| Methyl ethyl ketone | 90.0 |
| Xylene | 112.0 |
| Azobisisobutyronitrile | 3.8 |
| Portion 4 |  |
| Methyl methacrylate monomer | 187.0 |
| Butyl acrylate monomer | 219.0 |
| 2-Hydroxyethyl acrylate monomer | 31.0 |
| Acrylic acid monomer | 31.0 |
| Methyl ethyl ketone | 60.0 |
| Azobisisobutyronitrile | 8.8 |
| Portion 5 |  |
| Dimethylamino ethanol amine | 38.1 |
| Portion 6 |  |
| Water | 1800.0 |
| Total | 4075.6 |

Portion 1 is charged into the reaction vessel and heated to its reflux temperature with constant agitation and then portion 2 is added and the resulting mixture is held at its reflux temperature for 15 minutes. Portion 3 is added over a 80 minute period while maintaining the mixture at its reflux temperature and the mixture is held at this temperature for an additional 10 minutes. Portion 4 is slowly and continuously added over a 60 minute period while maintaining the mixture at its reflux temperature and then holding the mixture at its reflux temperature an additional 20 minutes. Heating of the mixture is stopped and portion 5 is added over a 15 minute period and the mixture is held for 45 minutes to allow neutralization of the acid to occur and then portion 6 is added over a 60 minute period to form an aqueous dispersion lacquer.

The aqueous dispersion lacquer has a film forming polymer solids content of about 38% by weight. The film forming polymer is about 60% by weight of a dispersed polymer of methyl methacrylate having a weight average molecular weight of about 85,400–102,000 and 10% by weight of a dispersant polymer of methyl methacrylate, butyl acrylate, hydroxyethyl acrylate and acrylic acid in a weight ratio of about 40/47/6.5/6.5 having a weight average molecular weight of about 47,000–65,000 and about 30% by weight of a graft copolymer of the above polymers having a weight average molecular weight of about 50,000–60,000.

A light blue lacquer paint is prepared as follows:

|  | grams |
|---|---|
| Aqueous dispersion lacquer (prepared above) | 202.08 |
| Alkyd resin solution (described in Example 1) | 23.53 |
| Blue mill base (prepared in Example 1) | 1.15 |
| White mill base (prepared in Example 1) | 0.20 |
| Black mill base (prepared in Example 1) | 0.66 |
| Aluminum mill base (prepared in Example 1) | 4.96 |
| Diethylene glycol monobutyl ether | 20.00 |
| Dimethyl ethanol amine | 0.37 |
| Water | 60.90 |
| Total | 313.85 |

The above constituents are thoroughly mixed together to form a light blue lacquer paint that is sprayed onto phosphatized steel panels primed and sealed as in Example 1. The resulting finish is baked as in Example 1 to form a hard, tough, durable, glossy and weatherable finish. The finish has a gloss measured at 20° of 77 and a gloss measured at 60° of 88.5, a hardness of 11.5 knoops and has good gasoline resistance and is craze resistant.

EXAMPLE 3

The following constituents are charged into a five liter polymerization vessel equipped as in Example 1:

|  | Parts by Weight |
|---|---|
| Portion 1 | |
| Methyl methacrylate monomer | 1010.5 |
| Diethylamino ethyl methacrylate monomer | 10.1 |
| Xylene | 159.0 |
| Methyl ethyl ketone | 272.1 |
| Portion 2 | |
| Azobisisobutyronitrile | 4.3 |
| Methyl ethyl ketone | 45.6 |
| Portion 3 | |
| Methyl methacrylate monomer | 233.9 |
| Diethylamino ethyl methacrylate monomer | 2.2 |
| Methyl ethyl ketone | 107.5 |
| Diethylene glycol monobutyl ether | 133.8 |
| Azobisisobutyronitrile | 4.3 |
| Portion 4 | |
| Methyl methacrylate monomer | 57.6 |
| Butyl acrylate monomer | 223.4 |
| Acrylic acid monomer | 27.4 |

|  | Parts by Weight |
|---|---|
| -continued | |
| Azobisisobutyronitrile | 6.4 |
| Diethylene glycol monobutyl ether | 88.2 |
| Portion 5 | |
| Dimethyl ethanol amine | 33.9 |
| Portion 6 | |
| Water | 1700.0 |
| Total | 4120.2 |

Portion 1 is charged into the reaction vessel and heated to its reflux temperature with constant agitation and then portion 2 is added and the resulting mixture is held at its reflux temperature for 15 minutes. Portion 3 is added over a 70 minute period while maintaining the mixture at its reflux temperature and the mixture is held at this temperature for an additional 10 minutes. Portion 4 is slowly and continuously added over a 60 minute period while maintaining the mixture at its reflux temperature and then holding the mixture at its reflux temperature an additional 20 minutes. Heating of the mixture is stopped and portion 5 is added over a 20 minute period and the mixture is held for 45 minutes to allow neutralization of the acid to occur and then portion 6 is added over a 60 minute period to form an aqueous dispersion lacquer.

The aqueous dispersion lacquer has a film forming polymer solids content of about 38% by weight. The film forming polymer is about 60% by weight of a dispersed polymer of methyl methacrylate and diethyl amino ethyl methacrylate in a 99/1 weight ratio and has a weight average molecular weight of about 85,400–102,000 and 10% weight of a dispersant polymer of methyl methacrylate, butyl acrylate, and acrylic acid in a weight ratio of about 19/72/9 and has a weight average molecular weight of about 47,000–65,000 and about 30% by weight of a graft copolymer of the above polymers having a weight average molecular weight of about 50,000 to 60,000.

A white lacquer paint is prepared as follows:

|  | grams |
|---|---|
| Aqueous Dispersion Lacquer (prepared above) | 187.77 |
| Alkyd resin solution (described in Example 1) | 23.53 |
| White mill base (prepared in Example 1) | 92.42 |
| Diethylene glycol monobutyl ether | 20.00 |
| Dimethyl ethanolamine | 0.37 |
| Water | 33.05 |
| Total | 357.14 |

The above constituents are thoroughly mixed together to form a white lacquer paint that is sprayed onto phosphatized steel panels primed and sealed as in Example 1. The resulting finish is baked as in Example 1 to form a hard, tough, durable, glossy and weatherable finish.

EXAMPLE 4

The following constituents are charged into a polymerization vessel equipped as in Example 1:

|  | Parts by Weight |
|---|---|
| Portion 1 | |
| Methyl methacrylate monomer | 891.0 |

-continued

| | Parts by Weight |
|---|---|
| Diethylamino ethyl methacrylate monomer | 4.6 |
| Methyl ethyl ketone | 220.0 |
| Xylene | 140.0 |
| Portion 2 | |
| Azobisisobutyronitrile | 3.8 |
| Methyl ethyl ketone | 38.0 |
| Portion 3 | |
| Methyl methacrylate monomer | 196.5 |
| Diethylamino ethyl methacrylate monomer | 1.0 |
| Methyl ethyl ketone | 90.0 |
| Xylene | 112.0 |
| Azobisisobutyronitrile | 3.8 |
| Portion 4 | |
| Methyl methacrylate monomer | 181.0 |
| Butyl acrylate monomer | 219.0 |
| 2-Hydroxyethyl acrylate monomer | 31.0 |
| Methacrylic acid monomer | 37.0 |
| Methyl ethyl ketone | 60.0 |
| Azobisisobutyronitrile | 8.8 |
| Portion 5 | |
| Dimethyl ethanol amine | 35.6 |
| Portion 6 | |
| Water | 1800.0 |
| Total | 4073.1 |

Portion 1 is charged into the reaction vessel and heated to its reflux temperature with constant agitation and then portion 2 is added and the resulting mixture is held at its reflux temperature for 15 minutes. Portion 3 is added over an 80 minute period while maintaining the mixture at its reflux temperature and the mixture is held at this temperature for an additional 10 minutes. Portion 4 is slowly and continuously added over a 60 minute period while maintaining the mixture at its reflux temperature and then holding the mixture at its reflux temperature an additional 20 minutes. Heating of the mixture is stopped and portion 5 is added over a 15 minute period and the mixture is held for 45 minutes to allow neutralization of the acid to occur and then portion 6 is added over a 60 minute period to form an aqueous dispersion lacquer.

The aqueous dispersion lacquer has a film forming polymer solids content of about 38% by weight. The film forming polymer is about 60% by weight of a dispersed polymer of methyl methacrylate and diethylamino ethyl methacrylate in a weight ratio of about 99.5/0.5 and has a weight average molecular weight of about 85,400–102,000 and 10% by weight of a dispersant polymer of methyl methacrylate, butyl acrylate, hydroxy ethyl acrylate and acrylic acid in a weight ratio of about 39/47/7/7 and has a weight average molecular weight of about 47,000–65,000 and about 30% by weight of a graft copolymer of the above polymers that has a molecular weight of about 50,000 to 60,000.

A coating composition is prepared as follows:

| | grams |
|---|---|
| Aqueous dispersion lacquer (prepared above) | 200.00 |
| Alkyd resin solution (described in Example 1) | 23.53 |
| Diethylene glycol monobutyl ether | 20.00 |
| Water | 10.00 |
| Total | 253.53 |

The above constituents are thoroughly mixed together to form a coating composition that is drawn down with a wire wound rod onto a phosphatized steel panel and baked as in Example 1 to form a finish that is hard, tough, durable, glossy and weatherable.

EXAMPLE 5

The following constituents are charged into a five liter reaction vessel equipped with a stirrer, reflux condenser, thermometer and a heating mantle:

| | Parts by Weight |
|---|---|
| Portion 1 | |
| Methyl methacrylate monomer | 886.3 |
| Diethylamino ethyl methacrylate monomer | 9.3 |
| Methyl ethyl ketone | 220.0 |
| Xylene | 140.0 |
| Portion 2 | |
| Azobisisobutyronitrile | 3.8 |
| Methyl ethyl ketone | 38.0 |
| Portion 3 | |
| Methyl methacrylate monomer | 195.5 |
| Diethylamino ethyl methacrylate monomer | 2.0 |
| Methyl ethyl ketone | 90.0 |
| Diethylene glycol monobutyl ether | 112.0 |
| Azobisisobutyronitrile | 3.8 |
| Portion 4 | |
| Methyl methacrylate monomer | 187.0 |
| Butyl acrylate monomer | 250.0 |
| Acrylic Acid monomer | 31.0 |
| Methyl ethyl ketone | 60.0 |
| Azobisisobutyronitrile | 8.8 |
| Portion 5 | |
| 2-Amino-2-methyl-1-propanol | 38.3 |
| Portion 6 | |
| Water | 1800.0 |
| Total | 4075.8 |

Portion 1 is charged into the reaction vessel and heated to its reflux temperature with constant agitation and then portion 2 is added and the resulting mixture is held at its reflux temperature for 15 minutes. Portion 3 is added over an 80 minute period while maintaining the mixture at its reflux temperature and the mixture is held at this temperature for an additional 10 minutes. Portion 4 is slowly and continuously added over a 60 minute period while maintaining the mixture at its reflux temperature and then holding the mixture at its reflux temperature an additional 20 minutes. Heating of the mixture is stopped and portion 5 is added over a 15 minute period and held for 45 minutes to allow neutralization of the acid to occur and then portion 6 is added over a 60 minute period to form an aqueous dispersion lacquer.

The aqueous dispersion lacquer has a film forming polymer solids content of about 38% by weight. The film forming polymer is about 60% by weight of a dispersed polymer of methyl methacrylate/diethylaminoethyl methacrylate and a weight average molecular weight of about 85,400–102,000 and 10% by weight of a dispersant polymer of methyl methacrylate, butyl acrylate and acrylic acid in a weight ratio of about 40/53/7 and has a weight average molecular weight of about 47,000–65,000 and about 30% by weight of a graft copolymer of the above polymer having a weight average molecular weight of about 50,000 to 60,000.

A coating composition is prepared as follows:

| | grams |
|---|---|
| Aqueous dispersion lacquer (prepared above) | 200.00 |
| Alkyd resin solution (described in Example 1) | 23.53 |
| Diethylene glycol monobutyl ether | 20.00 |

-continued

| | grams |
|---|---|
| Water | 10.00 |
| Total | 253.53 |

The above constituents are thoroughly mixed together to form a coating composition that is drawn down with a wire wound rod onto a phosphatized steel panel and baked as in Example 1 to form a finish that is hard, tough, durable, glossy and weatherable.

EXAMPLE 6

The following constituents are charged into a five liter reaction vessel equipped with a stirrer, reflux condenser, thermometer and a heating mantle:

| | Parts by Weight |
|---|---|
| Portion 1 | |
| Methyl methacrylate monomer | 808.5 |
| Methyl ethyl ketone | 215.6 |
| Xylene | 125.9 |
| Portion 2 | |
| Azobisisobutyronitrile | 3.4 |
| Methyl ethyl ketone | 36.1 |
| Portion 3 | |
| Methyl methacrylate monomer | 187.0 |
| Methyl ethyl ketone | 85.1 |
| Diethylene glycol monobutyl ether | 106.0 |
| Azobisisobutyronitrile | 3.4 |
| Portion 4 | |
| Methyl methacrylate monomer | 97.9 |
| Styrene monomer | 81.6 |
| Butyl acrylate monomer | 191.8 |
| Methacrylic acid monomer | 36.9 |
| Diethylene glycol monobutyl ether | 75.0 |
| Azobisisobutyronitrile | 6.1 |
| Portion 5 | |
| Methyl methacrylate monomer | 158.3 |
| Diethyleneglycol monobutyl ether | 27.0 |
| Azobisisobutyronitrile | 1.6 |
| Portion 6 | |
| Dimethylethanolamine | 38.3 |
| Water | 100.0 |
| Portion 7 | |
| Water | 1600.0 |
| Total | 3985.5 |

Portion 1 is charged into the reaction vessel and heated to its reflux temperature with constant agitation and then portion 2 is added and the resulting mixture is held at its reflux temperature for 15 minutes. Portion 3 is added over a 75 minute period while maintaining the mixture at its reflux temperature and the mixture is held at this temperature for an additional 10 minutes. Portion 4 is slowly and continuously added over a 45 minute period while maintaining the mixture at its reflux temperature and immediately after, portion 5 is added over a 15 minute period. The mixture is then held at its reflux temperature an additional 20 minutes. Heating of the mixture is stopped and portion 6 is added over a 20 minute period and the mixture is held for 45 minutes to allow neutralization of the acid to occur and then portion 7 is added over a 60 minute period to form an aqueous dispersion.

The aqueous dispersion lacquer has a film forming polymer solids content of about 40% by weight. The film forming polymer is about 60% by weight of a dispersed polymer of methyl methacrylate having a weight average molecular weight of about 80,000-100,000 and about 10% by weight of a dispersant polymer of methyl methacrylate/styrene/butyl acrylate/acrylic acid in a weight ratio of 24/20/47/9 having a weight average molecular weight of about 20,000-40,000 and 30% by weight of a graft copolymer of the dispersed polymer and the dispersant polymer having a weight average molecular weight of about 50,000-60,000.

A coating composition is prepared as follows:

| | grams |
|---|---|
| Aqueous dispersion lacquer (prepared above) | 200.00 |
| Alkyd resin solution (described in Example 1) | 23.53 |
| Diethylene glycol monombutyl ether | 20.00 |
| Water | 10.00 |
| Total | 253.53 |

The above constituents are thoroughly mixed together to form a coating composition that is drawn down with a wire wound rod onto a phosphatized steel panel and baked as in Example 1 to form a finish that is hard, tough, durable, glossy and weatherable.

EXAMPLE 7

The following constituents are charged into a five liter reaction vessel equipped with a stirrer, reflux condenser, thermometer and a heating mantle:

| | Parts by Weight |
|---|---|
| Portion 1 | |
| Methyl methacrylate monomer | 711.5 |
| Butyl methacrylate monomer | 97.0 |
| Methyl ethyl ketone | 215.6 |
| Xylene | 125.9 |
| Portion 2 | |
| Methyl ethyl ketone | 36.1 |
| Azobisisobutylronitrile | 3.4 |
| Portion 3 | |
| Methyl methacrylate monomer | 187.0 |
| Butyl methacrylate monomer | 22.4 |
| Methyl ethyl ketone | 85.1 |
| Diethylene monobutyl ether | 106.0 |
| Azobisisobutyronitrile | 3.4 |
| Portion 4 | |
| Methyl methacrylate monomer | 179.5 |
| Butyl acrylate monomer | 191.8 |
| Methacrylic acid monomer | 36.9 |
| Diethylene glycol monobutyl ether | 75.0 |
| Azobisisobutyronitrile | 6.1 |
| Portion 5 | |
| Methyl methacrylate monomer | 139.3 |
| Butyl methacrylate monomer | 19.0 |
| Diethylene glycol monobutyl ether | 27.0 |
| Azobisisobutyronitrile | 1.6 |
| Portion 6 | |
| Dimethylethanolamine | 38.3 |
| Water | 100.0 |
| Portion 7 | |
| Water | 1600.0 |
| Total | 4007.9 |

Portion 1 is charged into the reaction vessel and heated to its reflux temperature with constan agitation and then portion 2 is added and the resulting mixture is held at its reflux temperature for 15 minutes. Portion 3 is added over a 75 minute period while maintaining the mixture at its reflux temperature and the mixture is held at this temperature for an additional 10 minutes. Portion 4 is slowly and continuously added over a 45 minute period while maintaining the mixture at its reflux temperature and immediately after, portion 5 is added over a 15 minute period. The mixture is then held at its reflux temperature an additional 20 minutes. Heating of the mixture is stopped and portion 6 is added over a 20 minute period and the mixture is held for 45 minutes to allow neutralization of the acid to occur and then portion 7 is added over a 60 minute period to form an aqueous dispersion.

The aqueous dispersion lacquer has a film forming polymer solids content of about 40% by weight. The film forming polymer is about 60% by weight of a dispersed polymer of methyl methacrylate and butyl methacrylate in a weight ratio of 88/12 having a weight average molecular weight of about 80,000–100,000 and about 10% by weight of a dispersant polymer of methyl methacrylate/butyl acrylate/methacrylic acid in a weight ratio of 44/47/9 having a weight average molecular weight of about 20,000–40,000 and 30% by weight of a graft copolymer of the dispersed polymer and the dispersant polymer having a weight average molecular weight of about 50,000–60,000.

A coating composition is prepared as follows:

|  | grams |
| --- | --- |
| Aqueous dispersion lacquer (prepared above) | 200.00 |
| Alkyd resin solution (described in Example 1) | 23.53 |
| Diethylene glycol monobutyl ether | 20.00 |
| Water | 10.00 |
| Total | 253.53 |

The above constituents are thoroughly mixed together to form a coating composition that is drawn down with a wire wound rod onto a phosphatized steel panel and baked as in Example 1 to form a finish that is hard, tough, durable, glossy and weatherable.

EXAMPLE 8

The following constituents are charged into a five-liter reaction vessel equipped with a stirrer, reflux condenser, thermometer and a heating mantle:

|  | Parts by Weight |
| --- | --- |
| Portion 1 |  |
| Methyl methacrylate monomer | 900.2 |
| Methyl ethyl ketone | 231.81 |
| Xylene | 147.7 |
| Portion 2 |  |
| Azobisisobutyronitrile | 3.8 |
| Methyl ethyl ketone | 40.2 |
| Portion 3 |  |
| Methyl methacrylate monomer | 208.2 |
| Methyl ethyl ketone | 94.8 |
| Diethylene glycol monobutyl ether | 118.0 |
| Azobisisobutyronitrile | 3.8 |
| Portion 4 |  |
| Methyl methacrylate monomer | 171.7 |
| Butyl acrylate monomer | 250.0 |
| Acrylic Acid monomer | 31.0 |
| Diethylene glycol monobutyl ether | 88.2 |
| Azobisisobutyronitrile | 6.8 |
| Portion 5 |  |
| Dimethyl ethanol amine | 38.3 |
| Water | 100.0 |
| Portion 6 |  |
| Water | 1600.00 |

-continued

|  | Parts by Weight |
| --- | --- |
| Total | 4034.51 |

Portion 1 is charged into the reaction vessel and heated to its reflux temperature with constant agitation and then portion 2 is added and the resulting mixture is held at its reflux temperature for 15 minutes. Portion 3 is added over a 70 minute period while maintaining the mixture at its reflux temperature and the mixture is held at this temperature for an additional 10 minutes. Portion 4 is slowly and continuously added over a 60 minute period while maintaining the mixture at its reflux temperature. The mixture is then held at its reflux temperature an additional 20 minutes. Heating of the mixture is stopped and portion 5 is added over a 20 minute period and the mixture is held for 45 minutes to allow neutralization of the acid to occur and then portion 6 is added over a 60 minute period to form an aqueous polymer dispersion.

The resulting aqueous polymer dispersion has a polymer weight solids content of about 39%. The polymer content comprises 60 parts of dispersed polymer A of methyl methacrylate having a weight average molecular weight of about 80,000 12 parts by weight of a dispersant polymer B of methyl methacrylate, butyl acrylate and acrylic acid and having a weight average molecular weight of about 30,000 and 28 parts by weight of a graft copolymer of A and B having a weight average molecular weight of about 56,000.

A coating composition is prepared as follows:

|  | grams |
| --- | --- |
| Aqueous dispersion lacquer (prepared above) | 200.00 |
| Alkyd resin solution (described in Example 1) | 23.53 |
| Diethylene glycol monobutyl ether | 20.00 |
| Water | 10.00 |
| Total | 253.53 |

The above constituents are thoroughly mixed together to form a coating composition that is drawn down with a wire wound rod onto a phosphatized steel panel and baked as in Example 1 to form a finish that is hard, tough, durable, glossy and weatherable.

I claim:

1. An aqueous dispersion lacquer composition comprising about 5–60% by weight of a binder and about 40–95% by weight of an aqueous medium; wherein the binder consists essentially of about a dispersed Polymer A consisting essentially of methyl methacrylate and having a weight average molecular weight of about 60,000 to 110,000 measured by gel permeation chromatography using polystyrene as a standard;

a dispersant Polymer B comprising methyl methacrylate, an alkyl acrylate or an alkyl methacrylate, each having 2–12 carbon atoms in the alkyl group, and an ethylenically unsaturated carboxylic acid and having a weight average molecular weight of about 20,000 to 70,000, measured as above; and a graft copolymer comprising said dispersed Polymer A and dispersant Polymer B having a weight average molecular weight of about 50,000–80,000 measured as above; and containing sufficient base to provide a pH of about 7–9; wherein a finish of the composition is not crosslinked as determined by forming a self-supporting 2 mil thick film by baking a film of the composition for about 2 hours at about 160° C. and immersing said baked film in methylene chloride at a temperature of about 20° C. for about 2 hours, said film being substantially disintegrated after immersion in methylene chloride.

2. The aqueous lacquer of claim 1 containing dispersed pigments in a pigment to binder weight ratio of about 1/100 to 150/100.

3. The aqueous lacquer of claim 2 in which Polymer A contains up to 5% by weight, based on the weight of Polymer A, of a polymerized ethylenically unsaturated monomer having adhesion promoting groups.

4. The aqueous lacquer of claim 3 in which the ethylenically unsaturated monomer having adhesion promoting groups is an alkyl amino alkyl methacrylate having 1–4 carbon atoms in the alkyl groups.

5. The aqueous lacquer of claim 4 in which the alkyl amino alkyl methacrylate is diethyl amino ethyl methacrylate.

6. The aqueous lacquer of claim 5 in which Polymer A consists essentially of 99% by weight based on the weight of Polymer A, of methyl methacrylate and 1% by weight, based on the weight of Polymer A, of diethyl amino ethyl methacrylate.

7. The aqueous lacquer of claim 2 in which Polymer A contains up to 15% by weight, based on the weight of Polymer A, of an alkyl acrylate or an alkyl methacrylate each having 2–18 carbon atoms in the alkyl group.

8. The aqueous lacquer of claim 7 in which Polymer A contains up to 15% by weight, based on the weight of Polymer A, of butyl methacrylate.

9. The aqueous lacquer of claim 1 in which Polymer B consists essentially of about 15–60% by weight, based on the weight of Polymer B, of methyl methacrylate, 37–73% by weight, based on the weight of Polymer B, of an alkyl acrylate and 3–12% by weight, based on the weight of Polymer B, of an ethylenically unsaturated carboxylic acid.

10. The aqueous lacquer of claim 9 in which Polymer B consists essentially of methyl methacrylate, butyl acrylate and acrylic acid.

11. The aqueous lacquer of claim 9 in which Polymer B contains up to 10% by weight of a hydroxy alkyl acrylate or a hydroxy alkyl methacrylate.

12. The aqueous lacquer of claim 11 in which Polymer B consists essentially of about 30–60% by weight, based on the weight of Polymer B, of methyl methacrylate, 35–52% by weight, based on the weight of Polymer B, of an alkyl acrylate or an alkyl methacrylate, each having 2–12 carbon atoms in the alkyl groups, 2–8% by weight, based on the weight of Polymer B, of a hydroxy alkyl acrylate or a hydroxy alkyl methacrylate, each having 2–4 carbon atoms in the alkyl groups, and 3–10% by weight, based on the weight of Polymer B, of acrylic acid or methacrylic acid.

13. The aqueous lacquer of claim 12 in which Polymer B consists essentially of methyl methacrylate, butyl acrylate, hydroxy ethyl acrylate and acrylic acid.

14. The aqueous lacquer of claim 2 containing a sufficient amount of a capping agent that reacts with reactive groups on Polymer B and the graft copolymer.

15. The aqueous lacquer of claim 2 in which the capping agent is a hydroxy alkyl amide.

16. The aqueous lacquer of claim 15 in which the hydroxy alkyl amide is bis(N,N-dihydroxyethyl)adipamide.

17. The aqueous lacquer of claim 2 containing up to 5% by weight, based on the weight of the binder a crosslinking agent of the group of epoxy resins, melamine formaldehyde resins, alkylated melamine formaldehyde resins, phenol formaldehyde resins and benzoguanamine formaldehyde resins.

18. The aqueous lacquer of claim 1 in which the binder consists essentially of about 60–95% by weight, based on the weight of the binder, of Polymer A, Polymer B, and graft copolymer and 5–40% by weight, based on the weight of the binder, of an organic plasticizer.

19. The aqueous lacquer of claim 17 in which the plasticizer is a polyester resin.

20. The aqueous lacquer of claim 19 in which the polyester resin is the esterification product of phthalic anhydride, ethylene glycol and cocoanut oil.

21. The aqueous lacquer of claim 19 in which the plasticizer is a phthalate ester.

22. The aqueous lacquer of claim 18 in which the plasticizer is a low molecular weight polystyrene or poly alpha methyl styrene.

23. The aqueous lacquer of claim 18 in which the plasticizer is a low molecular weight acrylic polymer.

24. The aqueous lacquer of claim 1 in which the binder consists essentially of about
   35–94% by weight of Polymer A,
   5–40% by weight of Polymer B and
   1–40% by weight of a graft copolymer of Polymers A and B.

25. The aqueous lacquer of claim 24 in which the binder consists essentially of about
   60% by weight, based on the weight of the binder, of a dispersed Polymer A consisting essentially of methyl methacrylate and diethyl amino ethyl methacrylate in a weight ratio of 99/1;
   10% by weight, based on the weight of the binder, of a dispersant Polymer B consisting essentially of methyl methacrylate, butyl acrylate and acrylic acid in a weight ratio of 38/55/7 and
   30% by weight, based on the weight of the binder of a graft copolymer of Polymers A and B.

26. The aqueous lacquer of claim 24 in which the binder consists essentially of about
   60% by weight, based on the weight of the binder, of a dispersed Polymer A consisting of methyl methacrylate;
   10% by weight, based on the weight of the binder, of a dispersed Polymer B consisting essentially of about methyl methacrylate, butyl acrylate, hydroxy ethyl acrylate and acrylic acid in a weight ratio of 40/47/6.5/6.5 and 30% by weight, based on the weight of the binder, of a graft copolymer of Polymers A and B.

27. The aqueous lacquer of claim 24 in which the binder consists essentially of about
   60% by weight, based on the weight of the binder, of a dispersion Polymer A consisting essentially of methyl methacrylate and diethyl amino ethyl methacrylate in a weight ratio of 99/1;
   10% by weight, based on the weight of the binder, of a dispersant Polymer B consisting essentially of methyl methacrylate, butyl acrylate and acrylic acid in a weight ratio of about 19/72/9, and 30% by weight, based on the weight of the binder, of a graft copolymer of Polymers A and B.

28. The aqueous lacquer of claim 2 containing about 2-6% by weight of an organic solvent for Polymer A.

29. The aqueous lacquer of claim 2 containing up to 70% by weight of an organic solvent for Polymer A, Polymer B and the graft copolymer of Polymers A and B.

30. The aqueous lacquer of claim 1 containing about 0.1-5% by weight, based on the weight of the binder, of iron pyrophosphate.

31. A substrate coated with a dried layer about 0.1-5 mils thick of the composition of claim 1 in which Polymer A forms a continuous phase and Polymer B forms a discontinuous phase that is uniformly dispersed in the continuous phase and the graft copolymer being at the interface of Polymers A and B.

32. A process for preparing the aqueous dispersion lacquer of claim 1 which comprises the following steps:
(1) heating methyl methacrylate monomers to about 60°-150° C. for about 0.5-4 hours in a polymerization vessel in the presence of an organic solvent and a polymerization initiator to form Polymer A solution; Polymer A having a weight average molecular weight of about 60,000 to 110,000 measured by gel permeation chromatography;
(2) adding to Polymer A solution a monomer mixture of methyl methacrylate, an alkyl methacrylate or an alkyl acrylate, each having 2-12 carbon atoms in the alkyl groups and ethylenically unsaturated carboxylic acid and organic solvent and polymerization initiator while heating to 60°-150° C. for about 0.5-4 hours to form a solution of a blend of Polymer A, Polymer B and a graft copolymer of Polymers A and B; Polymer B having a weight average molecular weight of about 20,000-70,000 measured as above; and the graft copolymer having a weight average molecular weight of about 50,000-80,000 measured as above.
(3) adding a base to the above formed solution in a sufficient amount to provide the resulting composition with a pH of 7-9; and
(4) adding sufficient water to the solution of step (3) to form an aqueous dispersion containing about 5-60% by weight of Polymer A, Polymer B and graft copolymer.

33. The process of claim 32 in which up to 5% by weight, based on the weight of the resulting Polymer A, of polymerizable ethylenically unsaturated monomers having adhesion promoting groups are blended with the methyl methacrylate monomers of step (1).

34. The process of claim 32 in which up to 10% by weight, based on the weight of the resulting Polymer B, of hydroxy alkyl acrylate or hydroxy alkyl methacrylate monomers are made part of the monomers mixture of step (2).

* * * * *